US012470010B2

(12) United States Patent
Yun et al.

(10) Patent No.: US 12,470,010 B2
(45) Date of Patent: Nov. 11, 2025

(54) HOUSING HAVING DIFFERENT DIELECTRIC CONSTANTS

(71) Applicants: TE Connectivity Services GmbH, Schaffhausen (CH); TE Connectivity Germany GmbH, Bensheim (DE)

(72) Inventors: Hyo Chang (Chris) Yun, Fremont, CA (US); Mohammad Nikfal, Bensheim (DE); Xiaoming Luo, Middletown, PA (US)

(73) Assignee: TE CONNECTIVITY SOLUTIONS GmbH et al., Schaffhausen (CH)

( * ) Notice: Subject to any disclaimer, the term of this patent is extended or adjusted under 35 U.S.C. 154(b) by 1089 days.

(21) Appl. No.: 17/408,838

(22) Filed: Aug. 23, 2021

(65) Prior Publication Data

US 2023/0056932 A1 Feb. 23, 2023

(51) Int. Cl.

| | |
|---|---|
| ***H01R 13/516*** | (2006.01) |
| ***H01R 13/42*** | (2006.01) |
| *H01B 3/00* | (2006.01) |

(52) U.S. Cl.

CPC ........... *H01R 13/516* (2013.01); *H01R 13/42* (2013.01); *H01B 3/00* (2013.01)

(58) Field of Classification Search

CPC .................. H01R 13/516; H01R 13/42; H01R 13/65914; H01R 24/28; H01R 2103/00; H01R 13/6477; H01R 13/504; H01B 3/00

See application file for complete search history.

(56) References Cited

U.S. PATENT DOCUMENTS

| | | | | |
|---|---|---|---|---|
| 3,292,117 A * | 12/1966 | Bryant | H02G 15/085 | 333/260 |
| 4,886,463 A * | 12/1989 | Scott | H01R 13/6583 | 439/272 |
| 6,899,550 B2 * | 5/2005 | Perugini | H01R 13/405 | 439/607.05 |
| 2009/0181571 A1 * | 7/2009 | Willing | H01R 13/5202 | 439/359 |
| 2014/0017940 A1 * | 1/2014 | Chen | H01R 13/6477 | 439/607.02 |
| 2017/0271784 A1 * | 9/2017 | De Cloet | H01R 4/20 | |
| 2019/0264844 A1 * | 8/2019 | Stearns | F16L 19/07 | |
| 2020/0328562 A1 * | 10/2020 | Mandel | H01R 13/6477 | |
| 2021/0036471 A1 * | 2/2021 | Nikfal | H01R 13/6477 | |
| 2021/0257784 A1 * | 8/2021 | Markefka | H01R 13/6474 | |
| 2022/0368039 A1 * | 11/2022 | De Cloet | H01R 13/6474 | |
| 2023/0056932 A1 * | 2/2023 | Yun | H01R 13/6477 | |

* cited by examiner

*Primary Examiner* — Abdullah A Riyami
*Assistant Examiner* — Nader J Alhawamdeh

(57) ABSTRACT

A housing of a connector includes a first section and a second section connected to the first section and extending from the first section. The first section has a first dielectric constant. The second section has a second dielectric constant that is less than the first dielectric constant.

18 Claims, 7 Drawing Sheets

HOUSING HAVING DIFFERENT DIELECTRIC CONSTANTS

FIELD OF THE INVENTION

The present invention relates to a housing and, more particularly, to a housing of an electrical connector.

BACKGROUND

Electrical connectors connect to mating connectors in order to transfer power or data. An electrical connector commonly has a housing formed of an insulative material and a contact disposed within the housing. When the electrical connector is connected with the mating connector, the contact within the housing mates with and is electrically connected with a mating contact of the mating connector.

The housing of the electrical connector is commonly formed out of a single type of material and is enclosed along a length of the housing to contain the contact or contacts. The housing consequently has a dielectric constant, representing the electrical permeability of the housing that is consistent throughout the housing. When the connector is mated with the mating connector and the contact mates with the mating contact, the consistent dielectric constant of the housing results in a large impedance mismatch, which leads to signal loss or an inefficient transfer of power between the connector and the mating connector.

SUMMARY

A housing of a connector includes a first section and a second section connected to the first section and extending from the first section. The first section has a first dielectric constant. The second section has a second dielectric constant that is less than the first dielectric constant.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
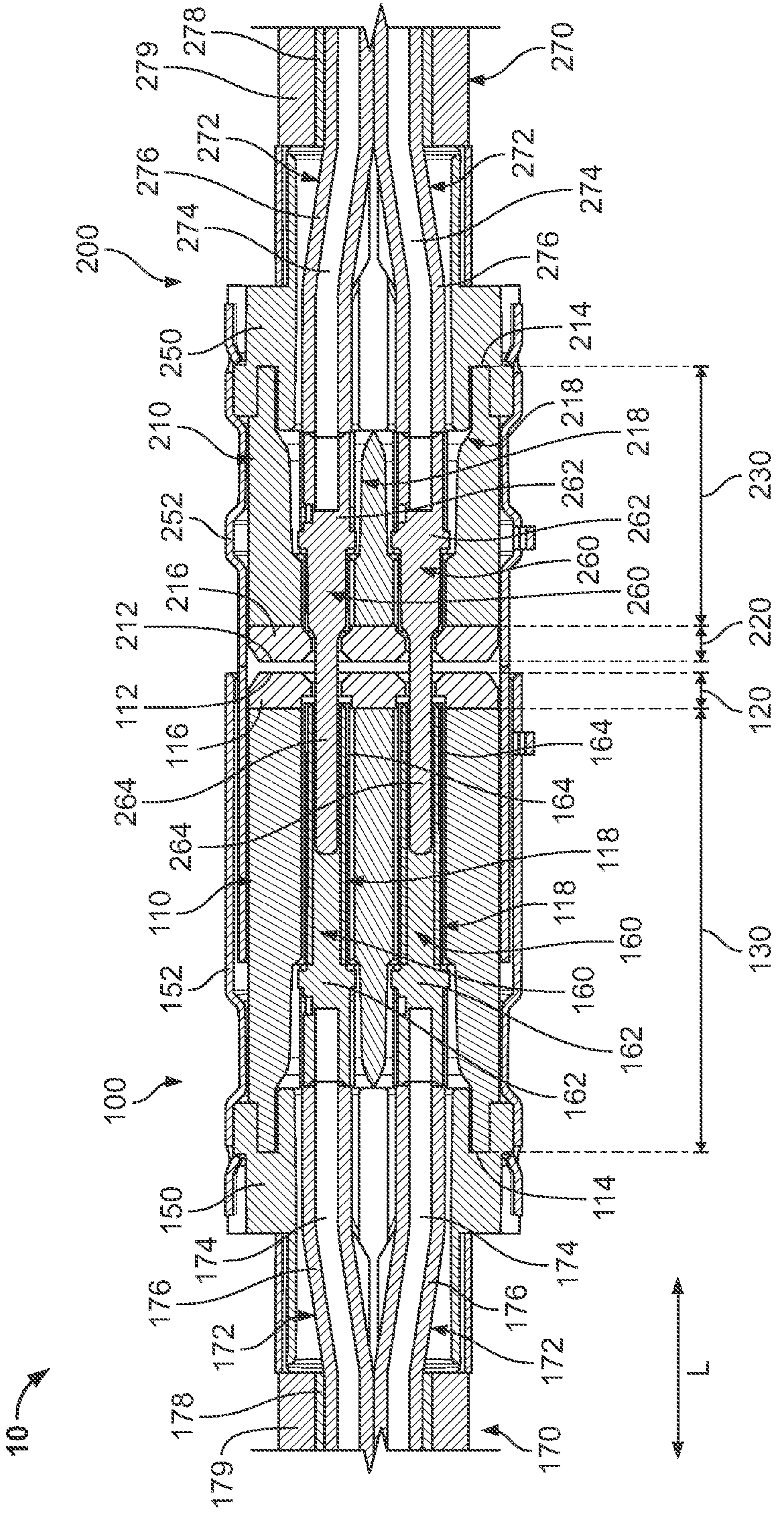
FIG. 1 is a sectional top view of a connector system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

A connector system 10 according to an embodiment is shown in FIG. 1. The connector system 10 comprises a connector 100 and a mating connector 200 matable with the connector 100.

The connector 100, as shown in FIG. 1, includes a housing 110, a ferrule 150 attached to the housing 110, an outer contact 152 disposed around the housing 110, and a pair of inner contacts 160 held within the housing 110.

As shown in FIG. 1, the housing 110 has a mating end 112 and a body end 114 opposite the mating end 112 along a longitudinal axis L. The housing 110 has a first section 120 disposed at the mating end 112 and a second section 130 connected to the first section 120 and extending from the first section 120 along the longitudinal axis L to the body end 114 of the housing 110. The second section 130 is separated from the mating end 112 by the first section 120 along the longitudinal axis L.

The first section 120 has a first dielectric constant and the second section 130 has a second dielectric constant that is less than the first dielectric constant. The dielectric constant, also referred to as a relative permittivity, is the ratio of the electrical permeability or permittivity of the respective section 120, 130 to the electrical permeability or permittivity of free space. The dielectric constant is the measure of an ability to store electrical energy. A higher dielectric constant indicates a less electrically insulating material while, conversely, a lower dielectric constant indicates a more electrically insulating material.

In an embodiment, the first dielectric constant is greater than or equal to 3.0. In an exemplary embodiment, the first dielectric constant is approximately 3.5. In another exemplary embodiment, the first dielectric constant is approximately 5.0. In an embodiment, the second dielectric constant is greater than or equal to 2.0. In another embodiment, the second dielectric constant is greater than or equal to 2.0 and less than 3.0. In another embodiment, the second dielectric constant is greater than or equal to 2.0 and less than or equal to 2.5. In an exemplary embodiment, the second dielectric constant is approximately 2.5.

In the embodiment shown in FIG. 1, the first section 120 is formed of a first material having the first dielectric constant and the second section 130 is formed of a second material different from the first material and having the second dielectric constant. In an embodiment, the first material is a ceramic and the second material is a polymer. In another embodiment, the second material is a polymer and the first material is the polymer of the second material with a filler, for example, ceramic powder, mica powder, minerals, or any other type of filler that would increase the dielectric constant of the polymer in which it is dispersed. In other embodiments, the first material can be any type of insulative material having a dielectric constant within one of the first dielectric constant ranges described above, and the second material can be any type of insulative material having a dielectric constant within one of the second dielectric constant ranges described above.

In the embodiment shown in FIG. 1, the first section 120 and the second section 130 are formed separately and are attached together by an adhesive 116 to form the housing 110. The adhesive 116 can be a liquid glue, a plastic weld between the sections 120, 130, or any other type of adhesive 116 used to connect insulative materials within an electrical connector.

As shown in FIG. 1, housing 110 has a pair of contact receiving passageways 118 extending through the first section 120 and the second section 130 along the longitudinal axis L. In the shown embodiment, the housing 110 has two contact receiving passageways 118. In other embodiments, the housing 110 could have one contact receiving passageway 118 or three or more contact receiving passageways 118. The first section 120 and the second section 130, in the embodiment shown in FIG. 1, do not have any openings extending through the first material or the second material of the section 120, 130 in a direction perpendicular to the longitudinal axis L; the first section 120 and the second section 130 are both solid members in the direction perpendicular to the longitudinal axis L.

The ferrule 150 of the connector 100 is formed of a conductive or dielectric material and, as shown in FIG. 1, is attached to the body end 114 of the housing 110. The outer contact 152 is formed of a conductive material and is disposed around the housing 110. The outer contact 152 is electrically connected to the ferrule 150.

The inner contacts 160 of the connector 100 are each formed of a conductive material and, as shown in FIG. 1, are each held within one of the contact receiving passageways 118 of the housing 110. The inner contacts 160 each have a body portion 162 and a mating portion 164 extending from the body portion 162 along the longitudinal axis L. The body portion 162 is positioned within the second section 130 of the housing 110 and the mating portion 164 is positioned adjacent to the first section 120 and the mating end 112. In the shown embodiment, the inner contacts 160 are receptacle contacts. In other embodiments, the inner contacts 160 could be pin contacts or any other type of contact used in electrical connectors. The inner contacts 160 are electrically isolated from the outer contact 152 by the housing 110. The connector 100 has two inner contacts 160 in the shown embodiment. In other embodiments, the connector 100 could have one inner contact 160 or three or more inner contacts 160, provided that the number of inner contacts 160 corresponds to the number of contact receiving passageways 118 of the housing 110.

In the embodiment shown in FIG. 1, the connector 100 is connected to a first cable 170. The first cable 170 has a pair of wires 172 twisted around each other; in the shown embodiment, the first cable 170 is a shielded twisted pair cable. Each of the wires 172 has a conductor 174 and an insulation layer 176 disposed around the conductor 174. The first cable 170 has a shield 178 formed of a conductive material and disposed around the wires 172. The first cable 170 has a jacket 179 formed of an insulative material and disposed around the shield 178 and the wires 172.

As shown in FIG. 1, the wires 172 are untwisted in a region to extend through the ferrule 150 and into the housing 110. The conductors 174 of the wires 172 are electrically and mechanically connected to the inner contacts 160, for example by crimping. The shield 178 is electrically connected to the ferrule 150 and to the outer contact 152 via the ferrule 150.

The mating connector 200, as shown in FIG. 1, includes a mating housing 210, a mating ferrule 250 attached to the mating housing 210, a mating outer contact 252 disposed around the mating housing 210, and a pair of mating inner contacts 260 held within the mating housing 210.

As shown in FIG. 1, the mating housing 210 has a mating end 212 and a body end 214 opposite the mating end 212 along the longitudinal axis L. The mating housing 210 has a third section 220 disposed at the mating end 212 and a fourth section 230 connected to the third section 220 and extending from the third section 220 along the longitudinal axis L to the body end 214 of the mating housing 210. The fourth section 230 is separated from the mating end 212 by the third section 220 along the longitudinal axis L. In the shown embodiment, the third section 220 is dimensioned similarly to the first section 120 along the longitudinal axis L while the fourth section 230 is shorter than the second section 130 along the longitudinal axis L.

The third section 220 has a third dielectric constant and the fourth section 230 has a fourth dielectric constant that is less than the third dielectric constant. In an embodiment, the third dielectric constant of the third section 220 is identical to the first dielectric constant of the first section and the fourth dielectric constant of the fourth section 230 is identical to the second dielectric constant of the second section 130. In another embodiment, the third dielectric constant can be identical to the first dielectric constant while the fourth dielectric constant is different than the second dielectric constant. In another embodiment, the third dielectric constant can be different from the first dielectric constant while the fourth dielectric constant is different from the second dielectric constant.

In an embodiment, the third dielectric constant is greater than or equal to 3.0. In an exemplary embodiment, the third dielectric constant is approximately 3.5. In another exemplary embodiment, the third dielectric constant is approximately 5.0. In an embodiment, the fourth dielectric constant is greater than or equal to 2.0. In another embodiment, the fourth dielectric constant is greater than or equal to 2.0 and less than 3.0. In another embodiment, the fourth dielectric constant is greater than or equal to 2.0 and less than or equal to 2.5. In an exemplary embodiment, the fourth dielectric constant is approximately 2.5.

In the embodiment shown in FIG. 1, the third section 220 is formed of a third material having the third dielectric constant and the fourth section 230 is formed of a fourth material different from the third material and having the fourth dielectric constant. As similarly described with respect to the third dielectric constant and the fourth dielectric constant above, the third material and the fourth material can be the same as or different from the first material of the first section 120 and the second material of the second section 130, respectively, in various embodiments. The third material and the fourth material can be any type of insulative material having a dielectric constant within the corresponding range.

In the embodiment shown in FIG. 1, the third section 220 and the fourth section 230 are formed separately and are attached together by an adhesive 216. The adhesive 216 can be a liquid glue, a plastic weld between the sections 220, 230, or any other type of adhesive 216 used to connect insulative materials within an electrical connector.

As shown in FIG. 1, mating housing 210 has a pair of mating contact receiving passageways 218 extending through the third section 220 and the fourth section 230 along the longitudinal axis L. In the shown embodiment, the mating housing 210 has two mating contact receiving passageways 218. In other embodiments, the mating housing 210 could have one mating contact receiving passageway 218 or three or more mating contact receiving passageways

218, provided that the number of mating contact receiving passageways 218 corresponds to the number of contact receiving passageways 118. The third section 220 and the fourth section 230, in the embodiment shown in FIG. 1, do not have any openings extending through the third material or the fourth material of the section 220, 230 in a direction perpendicular to the longitudinal axis L; the third section 220 and the fourth section 230 are both solid members in the direction perpendicular to the longitudinal axis L.

The mating ferrule 250 of the mating connector 200 is formed of a conductive or dielectric material and, as shown in FIG. 1, is attached to the body end 214 of the mating housing 210. The mating outer contact 252 is formed of a conductive material and disposed around the mating housing 210. The mating outer contact 252 is electrically connected to the mating ferrule 250.

The mating inner contacts 260 of the mating connector 200 are each formed of a conductive material and, as shown in FIG. 1, are each held within one of the mating contact receiving passageways 218 of the mating housing 210. The mating inner contacts 260 each have a body portion 262 and a mating portion 264 extending from the body portion 262 along the longitudinal axis L. The body portion 262 is positioned within the fourth section 230 of the mating housing 210 and the mating portion 264 protrudes beyond the third section 220 and beyond the mating end 212 along the longitudinal axis L.

In the embodiment shown in FIG. 1, the mating inner contacts 260 are pin contacts. In other embodiments, the mating inner contacts 260 could be receptacle contacts or any other type of contact used in electrical connectors. The mating inner contacts 260 are electrically isolated from the mating outer contact 252 by the mating housing 210. The mating connector 200 has two mating inner contacts 260 in the shown embodiment. In other embodiments, the mating connector 200 could have one mating inner contact 260 or three or more mating inner contacts 260, provided that the number of mating inner contacts 260 corresponds to the number of mating contact receiving passageways 218 and to the number of inner contacts 260 of the connector 100.

In the embodiment shown in FIG. 1, the mating connector 200 is connected to a second cable 270. The second cable 270 has a pair of wires 272 twisted around each other; in the shown embodiment, the second cable 270 is a shielded twisted pair cable. Each of the wires 272 has a conductor 274 and an insulation layer 276 disposed around the conductor 274. The second cable 270 has a shield 278 formed of a conductive material and disposed around the wires 272. The second cable 270 has a jacket 279 formed of an insulative material and disposed around the shield 278 and the wires 272.

As shown in FIG. 1, the wires 272 are untwisted in a region to extend through the mating ferrule 250 and into the mating housing 210. The conductors 274 of the wires 272 are electrically and mechanically connected to the mating inner contacts 260, for example by crimping. The shield 278 is electrically connected to the mating ferrule 250 and to the mating outer contact 252 via the mating ferrule 250.

The connector 100 and the mating connector 200 are mated as shown in FIG. 1. The connectors 100, 200 are moved together along the longitudinal axis L until the housing 110 is positioned adjacent to the mating housing 210 along the longitudinal axis L. The first section 120 is disposed adjacent to and facing the third section 220 in the mated position. The inner contacts 160 are mated and electrically connected with the mating inner contacts 260, electrically connecting the conductors 174 of the first cable 170 with the conductors 274 of the second cable 270. The outer contact 152 electrically connects with the mating outer contact 252 in the mated position, electrically connecting the shield 178 of the first cable 170, the ferrule 150 of the connector 100, the mating ferrule 250 of the mating connector 200, and the shield 178 of the second cable 270 to form an electromagnetic shielding in the shown embodiment.

Figure 2:
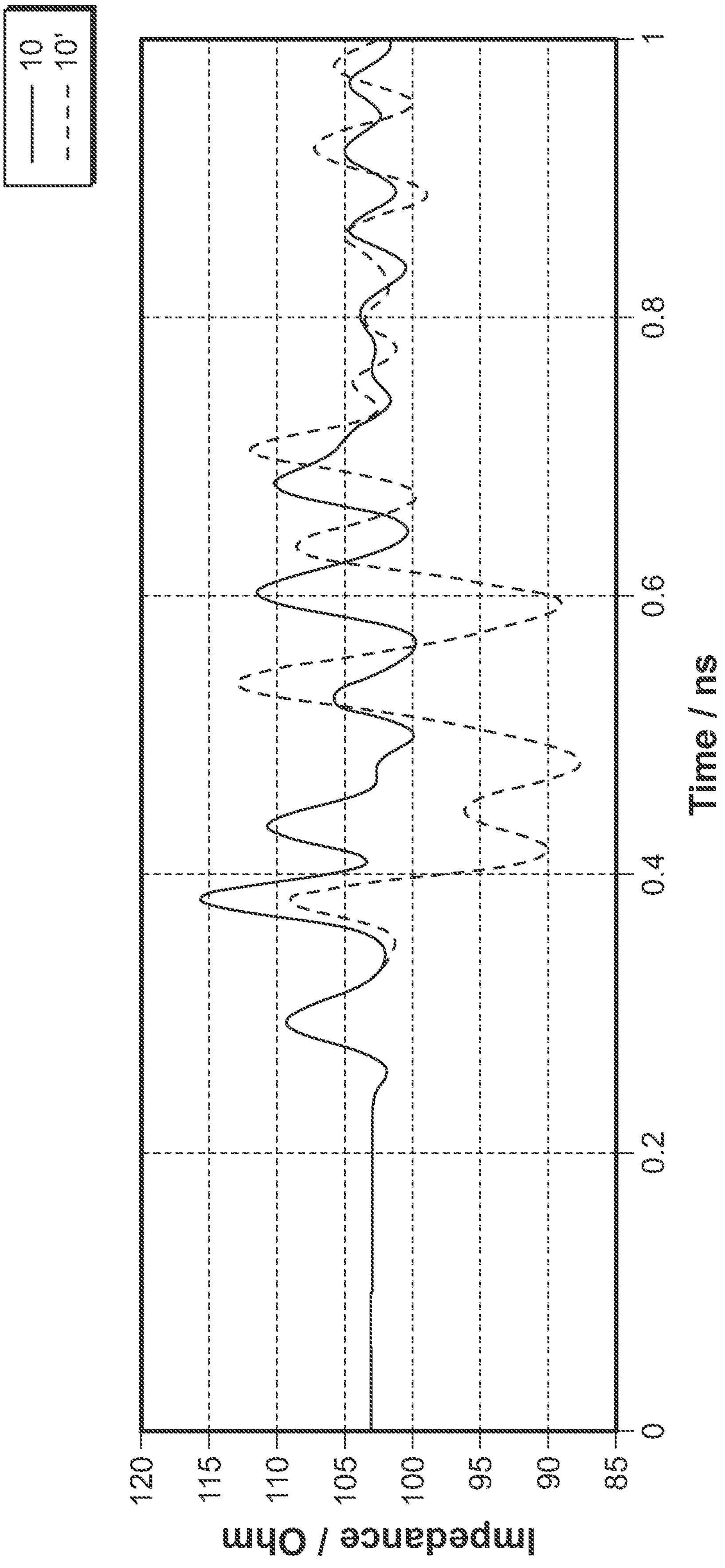
FIG. 2 is a graph of an impedance of the connector system of FIG. 1 over time.

In the mated position of the connectors 100, 200 forming the connector system 10 shown in FIG. 1, while the inner contacts 160 mated with the mating inner contacts 260 transmit power or data, the first dielectric constant of the first section 120, the second dielectric constant of the second section 130, the third dielectric constant of the third section 220, and the fourth dielectric constant of the fourth section 230 minimize an impedance mismatch as shown in FIG. 2.

FIG. 2 is a graph of an impedance of the connector system 10 over time compared to a connector system 10' according to the prior art. The connector system 10' of the prior art has a housing with a dielectric constant that is consistent throughout the housing. As shown in FIG. 2, the impedance of the connector system 10' according to the prior art, attempting to be controlled around 103 Ohms in the exemplary embodiment, varies from lower than 90 Ohms to greater than 110 Ohms. The prior art connector system 10' has an overall variance in impedance of more than 25 Ohms in the exemplary embodiment; a high impedance mismatch that leads to signal loss or an inefficient transfer of power.

The connector system 10, as shown in FIG. 2, results in a lower impedance mismatch under the same exemplary conditions that seek to control the impedance at around 103 Ohms. The connector system 10, due to the first dielectric constant of the first section 120, the second dielectric constant of the second section 130, the third dielectric constant of the third section 220, and the fourth dielectric constant of the fourth section 230 described in detail above, varies from around 100 Ohms to around 115 Ohms. The connector system 10 minimizes an impedance mismatch, decreasing signal loss or increasing the efficiency of the power transfer between the connector 100 and the mating connector 200.

Other embodiments of the housing 110 and the mating housing 210 of other connector systems 20, 30, 40, 50 are shown and described in detail below with respect to FIGS. 3-7. The housings 110 according to the embodiments described below are incorporated into the connector 100 with the other elements of the connector 100 in the same manner as the housing 110 described above, and the mating housings 210 described below are incorporated into the mating connector 200 with the other elements of the mating connector 200 in the same manner as the mating housing 210 described above. For the sake of brevity and clarity of the description, the elements of the connector 100 aside from the housing 110 and the elements of the mating connector 200 aside from the mating housing 210 will not be repeated below, but are the same as described above. The description of the below embodiments will focus on the differences of the housings 110, 210 of the connector systems 20, 30, 40, 50 with respect to the housings 110, 210 of the connector system 10 in the embodiment of FIG. 1, wherein like reference numbers refer to like elements.

Figure 3:
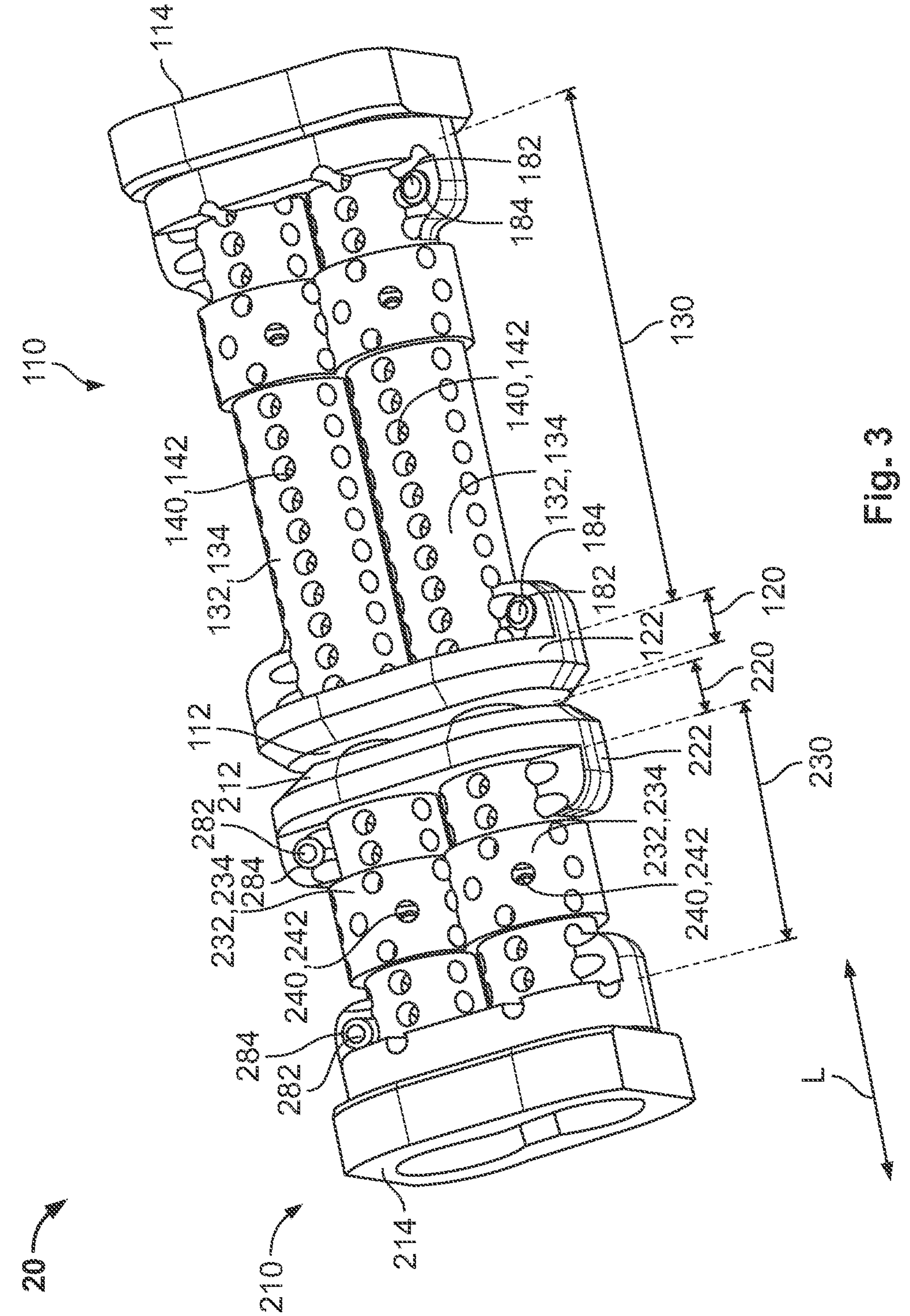
FIG. 3 is a perspective view of a housing and a mating housing of a connector system according to another embodiment.
Figure 4:
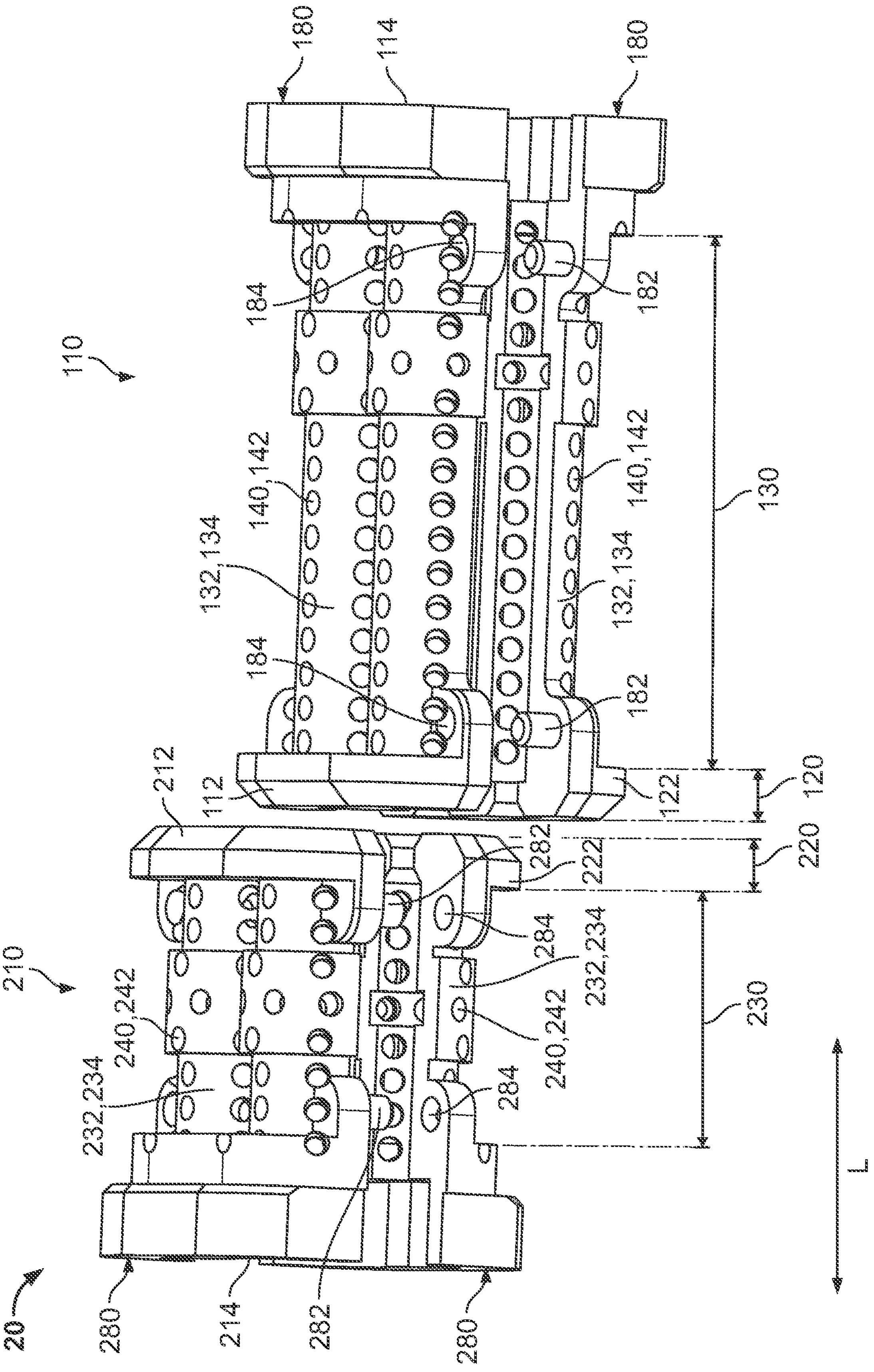
FIG. 4 is an exploded perspective view of the housing and the mating housing of FIG. 3.

The housing 110 and the mating housing 210 of a connector system 20 according to another embodiment are shown in FIGS. 3 and 4. In the shown embodiment, the first section 120 is formed of a housing material that is a same housing material as the second section 130, and the third section 220 is formed of a housing material that is a same housing material as the fourth section 230. In an embodiment, the housing material of the first section 120 and the second section 130 is the same as the housing material of the third section 220 and the fourth section 230. In other embodiments, the housing material of the first section 120 and the second section 130 can be different from the housing material of the third section 220 and the fourth section 230.

The housing material for the housing 110 and the mating housing 210 can be any type of insulative material, such as a polymer, having a dielectric constant of greater than or equal to 2.5. In an exemplary embodiment, the housing material has a dielectric constant of 3.0.

In the embodiment shown in FIGS. 3 and 4, the first dielectric constant of the first section 120 is achieved by forming the first section 120 as a solid member 122 of the housing material. The solid member 122 does not have any openings extending through the first section in a direction perpendicular to the longitudinal axis L. The formation of the first section 120 as the solid member 122 gives the first section 120 a first dielectric constant corresponding to the dielectric constant of the housing material. The first dielectric constant has the same ranges in various embodiments as described above with respect to the first section 120 of the connector system 10.

The second dielectric constant of the second section 130, as shown in FIGS. 3 and 4, is achieved by forming the second section 130 as a plurality of structural members 132 of the housing material, with each of the structural members 132 having a plurality of openings 140 extending through the structural members 132 in a direction perpendicular to the longitudinal axis L. In the embodiment shown in FIGS. 3 and 4, the structural members 132 are each a tubular member 134 extending from the first section 120 along the longitudinal axis L and the openings 140 are each circular openings 142.

The second dielectric constant of the second section 130 is less than the first dielectric constant of the first section 120 in the embodiment of FIGS. 3 and 4 because, despite using the same housing material for the structural members 132 of the second section 130 as for the solid material 122 of the first section 120, the openings 140 in the structural members 132 lower the second dielectric constant in the second section 130.

The second dielectric constant can be tailored by controlling a total opening volume of the openings 140, calculated as a percentage of a total surface area of the openings 140 to a total surface area of the housing 110. Varying the total opening volume of the openings 140 changes the second dielectric constant of the second section 130; as the total opening volume increases, the second dielectric constant decreases. For a housing material having a dielectric constant of approximately 3.0, for example, a total opening volume of approximately 20% gives a second dielectric constant of approximately 2.4, a total opening volume of approximately 30% gives a second dielectric constant of approximately 2.2, and a total opening volume of approximately 40% gives a second dielectric constant of approximately 2.1. In the embodiment show in FIGS. 3 and 4, the total opening volume of the openings 140 is approximately 20%, giving a second dielectric constant of approximately 2.4. In various embodiments, the total opening volume of the openings 140 is greater than 0% and less than or equal to 40%.

In the embodiment shown in FIGS. 3 and 4, at least a portion of the first section 120 and a portion of the second section 130 are monolithically formed together in a single piece from the housing material. In an embodiment, the first section 120 and the second section 130 are formed together by a 3D printing process that uses the housing material to form the first section 120 as the solid member 122 and, together with the first section 120, forms the second section 130 with the structural members 132 having the openings 140. The 3D printing process, in various embodiments, can be a digital light processing (DLP) process, a multij et printing process, a selective thermoplastics electrophotography (STEP) process, or any other type of 3D printing process that can create the first section 120 as a solid member 122 and the second section 130 with the structural members 132 having the openings 140. The formation of the structural members 132 with the 3D printing process allows for control of the dielectric constants in the shown embodiment, controlling the impedance mismatch as described above with respect to FIG. 2.

In an embodiment, the first section 120 and the second section 130 of the housing 110 can be entirely monolithically formed together in a single piece from the housing material, for example by one of the 3D printing processes described above. In another embodiment, as shown in FIG. 4, the housing 110 is formed of a pair of halves 180 that are connected to each other to form the housing 110.

As shown in the embodiment of FIG. 4, each of the halves 180 of the housing 110 has a portion of the first section 120 and a portion of the second section 130. Each of the halves 180 is monolithically formed in a single piece from the housing material. One of the halves 180 has a plurality of pegs 182 and the other of the halves 180 has a plurality of peg passageways 184 corresponding to the pegs 182. As shown in FIG. 3, the pegs 182 are inserted into the peg passageways 184 to couple and connect the halves 180 with each other to form the housing 110 in the shown embodiment.

In the connector system 20 shown in FIGS. 3 and 4, the third dielectric constant of the third section 220 and the fourth dielectric constant of the fourth section 230 of the mating housing 210 are created similarly to corresponding sections 120, 130 of the housing 110. The third section 220 is a solid member 222 of the housing material and the fourth section 230 has a plurality of structural members 232, formed as tubular members 234 in the shown embodiment, with a plurality of openings 240 that can have a total opening volume tailored to create the fourth dielectric constant that is less than the third dielectric constant. The openings 240 are circular openings 242 in the shown embodiment.

The mating housing 210 can be formed monolithically in a single piece from the housing material, for example by one of the 3D printing processes described above, or can be formed in a pair of halves 280 connected to each other to form the mating housing 210, with each of the halves 280 monolithically formed in a single piece from the housing material. One of the halves 280 has a plurality of pegs 282 and the other of the halves 280 has a plurality of peg passageways 284 corresponding to the pegs 282. As shown in FIG. 3, the pegs 282 are inserted into the peg passageways 284 to couple and connect the halves 280 with each other to form the mating housing 210 in the shown embodiment.

Figure 5:
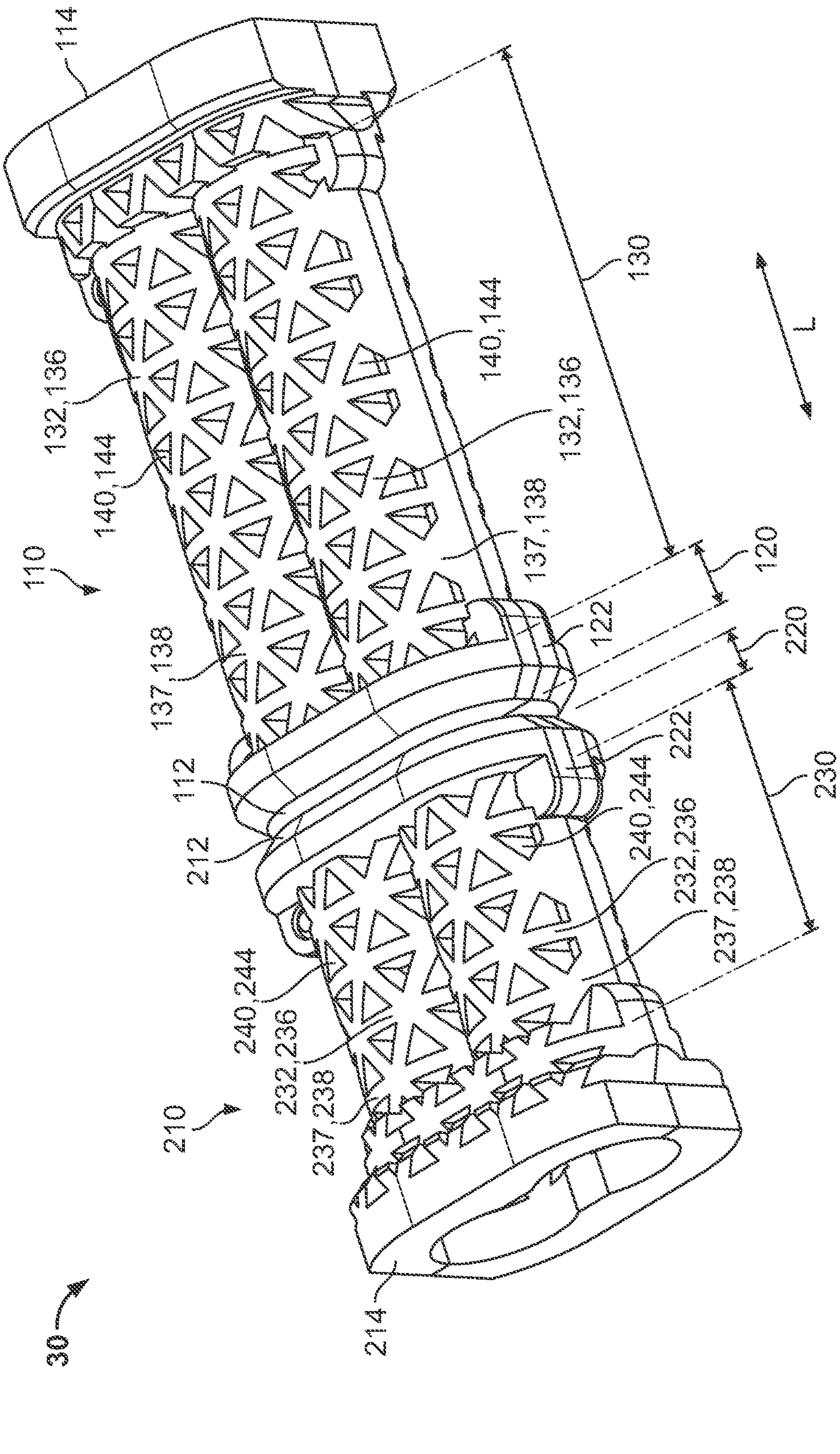
FIG. 5 is a perspective view of a housing and a mating housing of a connector system according to another embodiment.
Figure 6:
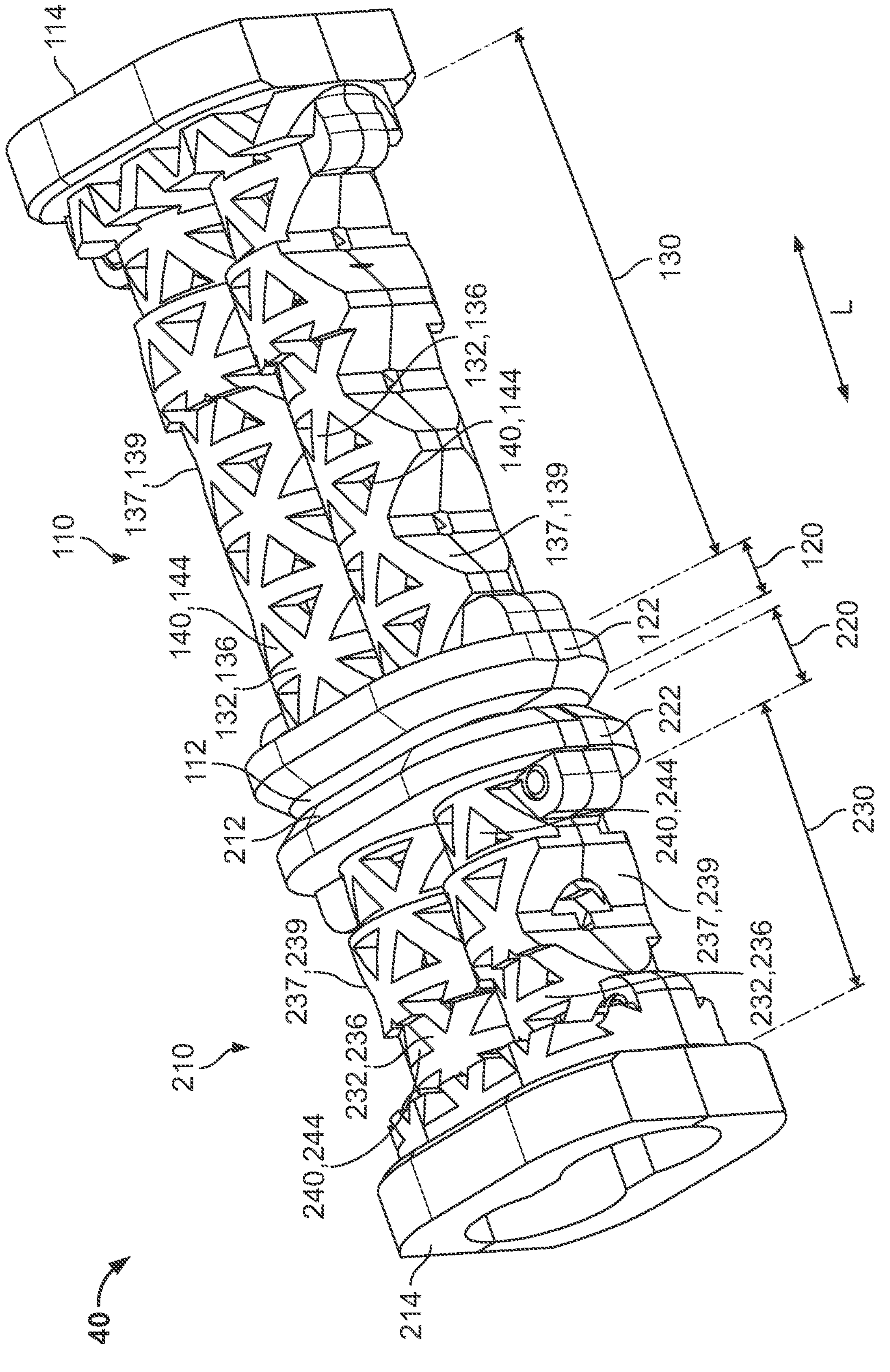
FIG. 6 is a perspective view of a housing and a mating housing of a connector system according to another embodiment.
Figure 7:
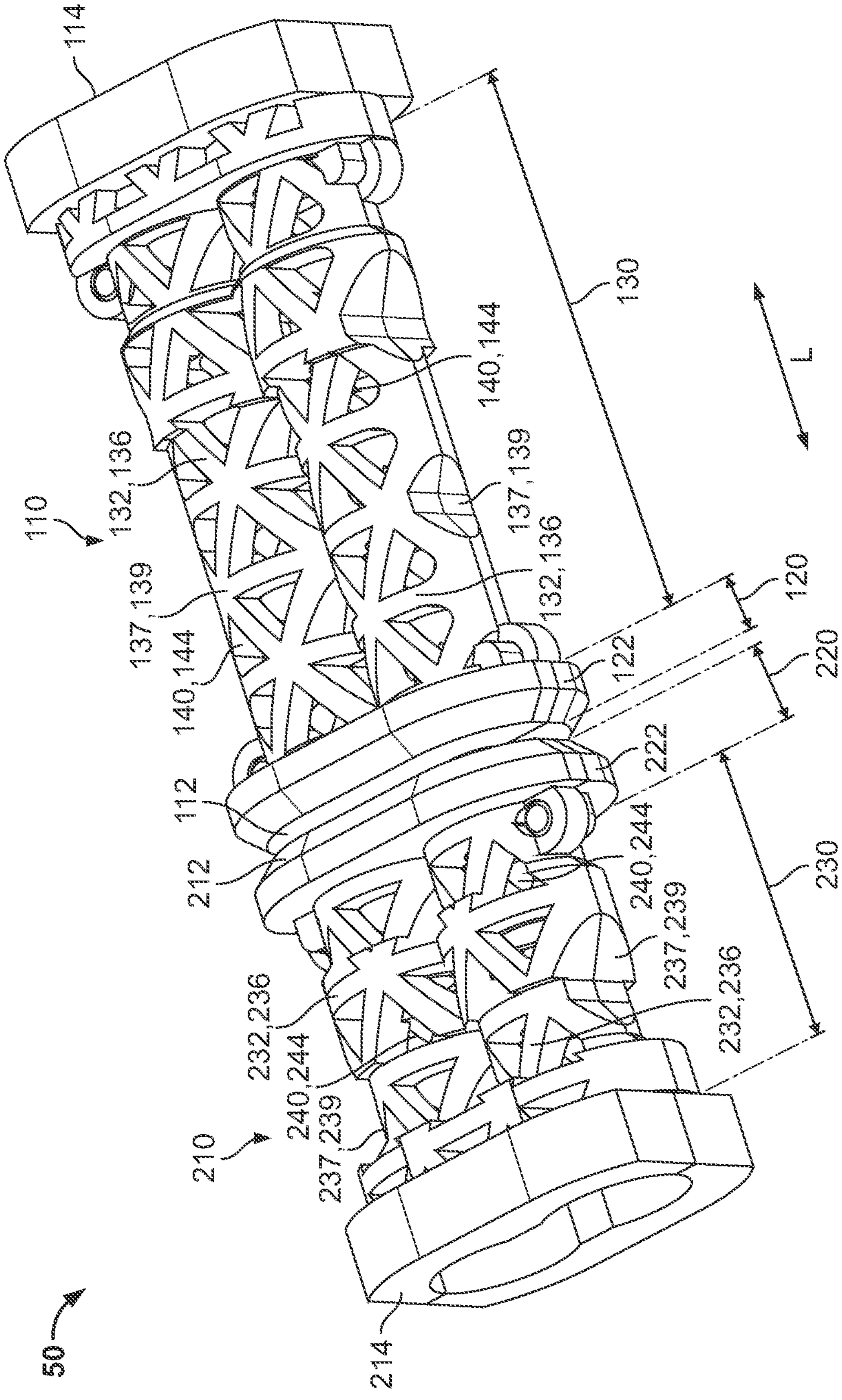
FIG. 7 is a perspective view of a housing and a mating housing of a connector system according to another embodiment.

Connector systems 30, 40, 50 having housings 110 and mating housings 210 according to other embodiments are shown in FIGS. 5-7. Like reference numbers indicate like elements and primarily the differences with respect to the connector system 20 shown in FIGS. 3 and 4 will be described in detail below.

In the connector system 30 shown in FIG. 5, the second section 130 of the housing 110 and the fourth section 230 of the mating housing 210 have the structural members 132, 232 each formed as a lattice structure 136, 236. The openings 140, 240 in the lattice structure 136, 236 are each polygonal openings 144, 244. The lattice structure 136, 236 of each of the second section 130 and the fourth section 230 has an outer contour 137, 237 with a circular outer cross-sectional shape 138, 238.

In the connector systems 40, 50 shown in FIGS. 6 and 7, the second section 130 of the housing 110 and the fourth section 230 of the mating housing 210 have the structural members 132, 232 each formed as the lattice structure 136, 236, but the lattice structure 136, 236 has an outer contour 137, 237 with a variable outer cross-sectional shape 139, 239 along the longitudinal axis L. The variable outer cross-sectional shapes 139, 239 in the embodiment of FIG. 6 differ from the variable outer cross-sectional shapes 139, 239 in the embodiment shown in FIG. 7.

As shown in FIGS. 5-7, the total opening volume of the openings 140, 240 can vary in different embodiments. In the exemplary embodiment shown in FIG. 5, the openings 140 have a total opening volume of approximately 29% and the openings 150 have a total opening volume of approximately 23%, providing a second dielectric constant of approximately 2.2 and a fourth dielectric constant of approximately 2.2. In the exemplary embodiment shown in FIG. 6, the openings 140 have a total opening volume of approximately 32% and the openings 150 have a total opening volume of approximately 31%, providing a second dielectric constant of approximately 2.1 and a fourth dielectric constant of approximately 2.1. In the exemplary embodiment shown in FIG. 7, the openings 140, 150 each have a total opening volume greater than the openings 140, 150 in FIG. 6, providing an even lower second dielectric constant and fourth dielectric constant.

In other embodiments, the structural members 132, 232 and the openings 140, 240 can have shapes and forms other than those in the shown embodiments, including other total openings volumes of the openings 140, 240, to tailor the second dielectric constant of the second section 130 to be less than the first dielectric constant of the first section 120, and to tailor the fourth dielectric constant of the fourth section 230 to be less than the third dielectric constant of the third section 220. As similarly described with respect to the embodiment of FIG. 1 above, the different dielectric constants of the housings 110, 210 in the embodiments of FIGS. 3-7 decrease the impedance mismatch, decreasing signal loss or increasing the efficiency of the power transfer in the connector system 20, 30, 40, 50.

What is claimed is:

1. A housing of a connector, comprising:

a first section having a first dielectric constant; and a second section connected to the first section and extending from the first section, the second section having a second dielectric constant that is less than the first dielectric constant, at least a portion of the first section and a portion of the second section are monolithically formed together in a single piece from a housing material.

2. The housing of claim 1, wherein the first section is disposed at a mating end of the housing.

3. The housing of claim 2, wherein the second section is separated from the mating end by the first section.

4. The housing of claim 1, further comprising a pair of halves connected to each other to form the housing, each of the halves has a part of the first section and a part of the second section, each of the halves is monolithically formed in a single piece from the housing material.

5. The housing of claim 1, wherein the first section and the second section are entirely monolithically formed together in the single piece from the housing material.

6. The housing of claim 1, wherein the first section is a solid member formed of the housing material and the second section has a plurality of structural members each with a plurality of openings extending through the structural members.

7. The housing of claim 6, wherein the structural members are each a tubular member and the plurality of openings are circular openings.

8. The housing of claim 6, wherein the structural members are each a lattice structure and the plurality of openings are polygonal openings.

9. The housing of claim 8, wherein an outer contour of the lattice structure has a circular outer cross-sectional shape or a variable outer cross-sectional shape.

10. The housing of claim 1, wherein the first dielectric constant is greater than or equal to 3.0.

11. The housing of claim 10, wherein the second dielectric constant is greater than to equal to 2.0.

12. The housing of claim 6, wherein a total opening volume of the openings is greater than 0% and less than or equal to 40% of a total surface area of the housing.

13. A connector, comprising:

a housing including a first section having a first dielectric constant and a second section connected to the first section and extending from the first section, the second section having a second dielectric constant that is less than the first dielectric constant, the first section is disposed at a mating end of the housing and the second section is separated from the mating end by the first section.

14. The connector of claim 13, further comprising an inner contact held within the housing, a mating portion of the inner contact is disposed adjacent to or protrudes beyond the first section.

15. The connector of claim 13, wherein the first section is a solid member and the second section has a plurality of structural members each with a plurality of openings extending through the structural members.

16. The connector of claim 13, wherein the first section is formed of a first material and the second section is formed of a second material different than the first material.

17. A connector system, comprising:

a connector having a housing, the housing having a first section with a first dielectric constant and a second section connected to the first section and extending from the first section, the second section having a second dielectric constant that is less than the first dielectric constant; and a mating connector having a mating housing, the mating housing having a third section with a third dielectric constant and a fourth section connected to the third section and extending from the third section, the fourth section having a fourth dielectric constant that is less than the third dielectric constant, the first section is disposed adjacent to and facing the third section in a mated position of the connector with the mating connector.

18. A housing of a connector, comprising:

a first section having a first dielectric constant; and a second section attached to the first section and extending from the first section, the second section having a second dielectric constant that is less than the first dielectric constant, the first section is formed of a first material and the second section is formed of a second material different than the first material.

* * * * *